July 8, 1952 D. R. DE BOISBLANC ET AL 2,602,838
ELECTRICAL MEASURING INSTRUMENT
Filed Nov. 25, 1949
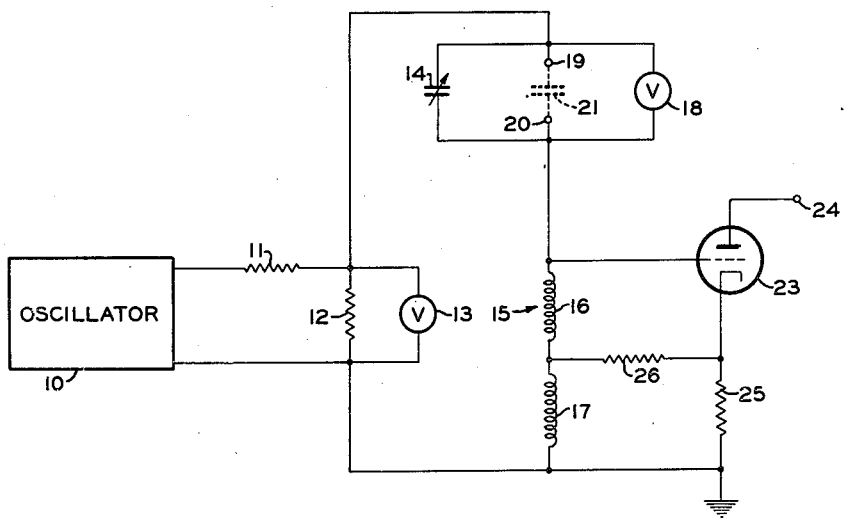
INVENTOR.
D. R. DE BOISBLANC
R. S. MARSDEN, JR
BY
ATTORNEYS Patented July 8, 1952

2,602,838

UNITED STATES PATENT OFFICE 2,602,838

ELECTRICAL MEASURING INSTRUMENT

Deslonde R. de Boisblanc and Ross S. Marsden, Jr., Bartlesville, Okla., assignors to Phillips Petroleum Company, a corporation of Delaware Application November 25, 1949, Serial No. 129,486

6 Claims. (Cl. 175—183)

This invention relates to an electrical measuring instrument. In another aspect, it relates to an instrument for measuring electrical characteristics, such as the capacitance, power factor, or dielectric constant of test materials or circuit components.

Various types of instruments have been devised for measuring the "Q" of an electrical circuit component or of a dielectric material. In general, such circuits include a tuned resonant circuit, either series or parallel, an oscillator for impressing a high frequency signal upon the resonant circuit, and a meter for measuring the voltage developed across the circuit or the current flowing through the circuit. The mechanical difficulties involved in producing a circuit having an extremely high value of Q are very great, and even the best designed inductance-capacitance units have a value of Q in the neighborhood of 500 which is sufficiently low as to substantially limit the usefulness of the circuit in determining the power factor, dielectric constant, or capacitance of a test material or circuit component.

As is well known in the art, the Q of a circuit is a measure of the sharpness of the frequency-current curve at resonance, and the sharpness of this curve, in turn, is dependent upon the resistance of the resonant circuit. This is true because the reactance of the capacitive and inductive parts of the circuit balance each other out at the resonant frequency of the circuit.

In accordance with this invention, I introduce a negative resistance into the resonant circuit of Q meters of the type known to the prior art. In this manner, the Q of the resonant circuit can be increased to substantially as high a value as desired, for example, 10,000, with the result that the Q meter may be utilized to provide an extremely accurate measurement of the power factor, dielectric constant, or capacitance of a test material or circuit component.

It is an an object of the invention to provide a novel measuring instrument for measuring the electrical characteristics of circuit components and dielectric materials.

It is a further object to provide an instrument for making extremely accurate measurements of the power factor, dielectric constant, or capacitance of a test material or circuit component.

It is a still further object to provide such an instrument at a low cost, the instrument being very reliable in operation and utilizing a minimum number of standard circuit components.

Various other objects, advantages and features of the invention will become apparent from the following detailed description taken in conjunction with the accompanying drawing, in which:

The figure is a schematic circuit diagram of a preferred embodiment of the invention.

Referring now to the drawing in detail, the instrument includes an oscillator or signal generator 10, the output of which is fed through a resistance 11 to a resistance 12, the signal voltage developed across the resistance 12 being indicated by a voltmeter 13. Connected in series with the resistance 12 is a resonant circuit including a variable condenser 14 and an inductance 15 having two sections 16 and 17. A voltmeter 18 is connected in shunt with variable condenser 14 to indicate the voltage across this condenser and a pair of terminals 19, 20 also connected in shunt with variable condenser 14, these terminals being adapted for connection to a test material or circuit component, such as a condenser 21.

The circuit, as thus far described, is basically similar to that shown in Snow Patent 2,137,787 and Loughlin Patent 2,337,759. As indicated in these patents, the Q of a circuit component connected to terminals 19, 20 may be measured in the following manner. The test material or component is removed from terminals 19, 20 and the circuit is tuned to resonance by adjustment of variable condenser 14 with the result that the Q of the circuit is the ratio of the voltage read by voltmeter 18 to voltage read by voltmeter 13. The test material or circuit component is then connected to terminals 19, 20 and condenser 14 is again adjusted until the circuit is tuned to resonance, the Q of the circuit after the second adjustment being the ratio of the readings on voltmeters 18 and 13. The Q of the circuit component under test is then given by the following formula:

$$Q = \frac{(C_2 - C_1) Q_1 Q_2}{C_1 (Q_1 - Q_2)}$$

where $C_1$ and $C_2$ are the capacitances of condenser 14 at resonance without and with the test component included in the circuit, respectively, while $Q_1$ and $Q_2$ are the Q values of the circuit without the test component or material included in the circuit and with the test component included in the circuit, respectively. For a high value of Q, the power factor of the component under test is the reciprocal of its Q. Hence, the reciprocal of the Q of the test component is the power factor thereof.

If the test component is a condenser, its capacitance may readily be measured by adjusting variable condenser 14 to produce resonance in the circuit without connecting the test condenser across terminals 19 and 20. Thereupon, the circuit is again adjusted to resonance with the test condenser connected to terminals 19, 20 and the capacitance of the test condenser is then equal to the difference in capacity between the original and final value assumed by the variable condenser 14.

The dielectric constant of a test material may be readily measured by providing a vessel having two plates insulated from each other and connected to the respective terminals 19 and 20. The capacitance of this unit is measured in the manner already described when the vessel is empty and when it is full of the sample whose dielectric constant is to be determined. The dielectric constant of the sample is then the ratio of the capacitance of the test unit when full of sample to the capacitance of the test unit when no sample is included between the plates.

Alternatively, the voltage indicated by meter 13 may be held constant, in which case any change in the dielectric constant or power factor of the material between the plates of test condenser 21 will produce a change in the voltage indicated by meter 18. This voltage may be recorded, if desired, to provide a permanent record of variations in power factor or dielectric constant of material continuously passing between the plates. As still another alternative, the sample may be placed inside inductance section 16 or 17 and the operation carried out in the manner previously described. It will be apparent that changes in the power factor or dielectric constant of the material will produce a similar effect upon the circuit as when the test component or material is connected between terminals 19 and 20.

As previously indicated, it is difficult to obtain a sufficiently high value of Q in the circuit thus far described since, no matter how carefully a coil or condenser is constructed, its resistance cannot be wholly eliminated. In accordance with this invention, this difficulty is completely overcome by introducing a negative resistance into the resonant circuit defined by the condenser 14 and inductance 15. As shown and preferably, the negative resistance is connected in circuit with the inductance rather than the capacitance and, to this end, the junction between condenser 14 and inductance section 16 is connected to the control grid of a tube 23, the anode of which is connected to a positive power supply terminal 24, and the cathode of which is grounded through a resistance 25, the lower end of inductance 17 also being grounded. The cathode of the tube is also connected through a resistance 26 to the junction between inductance 16 and 17.

Tube 23 is employed as a cathode follower, resulting in the potentials on the grid and cathode of said tube being in phase with one another. Hence, regenerative feedback energy is applied to the grid of tube 23 through the path comprising resistance 26 and inductance 16. Since inductance 16 forms part of the resonant circuit defined by condenser 14 and inductance 15 the feedback energy applied through inductance 16 tends to compensate for the energy loss due to the positive resistance inherent in said resonant circuit. Therefore, it can be seen that the amplifying tube circuit serves as a source of energy for the resonant circuit, thereby acting as a "negative resistance" which may be defined as a device wherein the current therethrough decreases as the voltage across said device increases, and vice versa. Resistance 26 is of such size as to prevent the amplifying tube circuit from oscillating, said circuit being utilized to reduce the positive resistance of the resonant circuit and not to produce independent oscillations. Accordingly, the Q of the resonant circuit is increased and may be raised to a value of greater than 10,000 as compared with a value of 500 obtainable with the best coils and condensers known to the prior art. With a circuit having a Q of 10,000 a change in Q or power factor of .00002 may be readily detected whereas with a Q of 500 or lower the power factor must change by .0004 in order to be detected. It will be evident, therefore, that the sensitivity of the instrument is much greater than is obtainable without the use of a negative resistance circuit in the combination. Moreover, the increased sharpness of the resonance curve resulting from the use of higher Q values enables a much more sensitive measurement to be made of the capacitance or dielectric constant of a test material or circuit component to be made.

It will be understood that the particular negative resistance circuit shown is only a preferred modification and the invention is not to be limited thereto. Any other suitable negative resistance circuit may be utilized in the combination without departing from the spirit and scope of the invention. The described circuit, however, yields outstanding results and is to be greatly preferred due to its simplicity.

While the invention has been described in connection with a present, preferred embodiment thereof, it is to be understood that this description is illustrative only and is not intended to limit the invention, the scope of which is defined by the appended claims.

We claim:

1. In an electrical measuring instrument, in combination, a resonant circuit including an inductance unit and a capacitance unit, means for impressing an alternating signal upon said resonant circuit, a negative resistance circuit connected across one of said units, a pair of terminals connected across one of said units, said terminals being adapted to receive a test material or circuit component, and means for indicating the output voltage of said source of alternating voltage and the voltage appearing across one of said units.

2. An electrical measuring instrument comprising, in combination, a variable condenser unit, an inductance unit, and a signal generator all connected in series, a pair of terminals connected in shunt with one of said units, a meter for indicating the voltage across said unit, a meter for indicating the output voltage of said signal generator, and a negative resistance circuit connected to the other of said units.

3. An electrical measuring instrument comprising, in combination, a variable condenser, an inductance, and a signal generator all connected in series, a set of terminals and a voltmeter both connected in shunt with said variable condenser, said terminals being adapted to receive a test material or circuit component, a meter for indicating the output voltage of said signal generator, and a circuit for producing a negative resistance across said inductance.

4. An electrical measuring instrument which comprises, in combination, a resistance, a variable condenser, and an inductance all connected in series, a voltmeter and a signal generator both connected in shunt with said resistance, a set of terminals and a voltmeter both connected in shunt with said variable condenser, said terminals being adapted for connection to a test material or circuit component, and means for providing a negative resistance across said inductance.

5. An electrical measuring instrument comprising, in combination, a signal generator, a variable condenser, and an inductance all connected in series, said inductance including two series-connected sections, a meter for indicating the output voltage of said signal generator, a set of terminals and a voltmeter both connected in shunt with said variable condenser, said terminals being adapted for connection to a test material or circuit component, an electron tube having an anode, a cathode and a control grid, means for supplying operating potentials to the electrodes of said tube, a lead connecting the control grid of said tube to the junction between said inductance and said variable condenser, a resistance connected between the cathode of said tube and the junction between said inductance sections, and a resistance connecting the cathode of said tube to the junction between said inductance and said signal generator.

6. An electrical measuring instrument comprising, in combination, a first resistance, a variable condenser, and an inductance all connected in series, said inductance including two series-connected sections, a second resistance, a signal generator, means for feeding the output of said signal generator through said second resistance to said first resistance, a voltmeter connected in shunt with said first resistance, a set of terminals and a voltmeter both connected in shunt with said variable condenser, said terminals being adapted for connection for a test material or a circuit component, an electron tube having an anode, a cathode, and a control grid, means for supplying operating potentials to the electrodes of said tube, a lead connecting said control grid to the junction between said inductance and said variable condenser, a resistance connecting said cathode to the junction between said inductance sections, and a resistance connecting said cathode to the junction between said inductance and said first resistance.

DESLONDE R. DE BOISBLANC.
ROSS S. MARSDEN JR.

REFERENCES CITED

The following references are of record in the file of this patent:

UNITED STATES PATENTS

| Number | Name | Date |
| --- | --- | --- |
| 2,137,787 | Snow | Nov. 22, 1938 |
| 2,260,002 | Clark | Oct. 21, 1941 |
| 2,274,347 | Rust et al. | Feb. 24, 1942 |
| 2,337,759 | Loughlin | Dec. 28, 1943 |

OTHER REFERENCES

Electronic Engineering, April 1943, pages 452–456.